(12) United States Patent
Yang

(10) Patent No.: US 7,856,148 B2
(45) Date of Patent: Dec. 21, 2010

(54) PROCESSING MULTIVIEW VIDEO

(75) Inventor: Jeong Hyu Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 812 days.

(21) Appl. No.: 11/622,592

(22) Filed: Jan. 12, 2007

(65) Prior Publication Data

US 2007/0177811 A1 Aug. 2, 2007

Related U.S. Application Data

(60) Provisional application No. 60/758,234, filed on Jan. 12, 2006, provisional application No. 60/759,620, filed on Jan. 18, 2006, provisional application No. 60/762,534, filed on Jan. 27, 2006, provisional application No. 60/787,193, filed on Mar. 30, 2006, provisional application No. 60/818,274, filed on Jul. 5, 2006, provisional application No. 60/830,087, filed on Jul. 12, 2006, provisional application No. 60/830,328, filed on Jul. 13, 2006.

(30) Foreign Application Priority Data

| Jan. 17, 2006 | (KR) | ............... 10-2006-0004956 |
| Mar. 24, 2006 | (KR) | ............... 10-2006-0027100 |
| Apr. 26, 2006 | (KR) | ............... 10-2006-0037773 |
| Nov. 9, 2006 | (KR) | ............... 10-2006-0110337 |
| Nov. 9, 2006 | (KR) | ............... 10-2006-0110338 |

(51) Int. Cl.
*G06K 9/36* (2006.01)
(52) U.S. Cl. ................ 382/238; 382/232; 382/233
(58) Field of Classification Search .......... 382/232, 382/233, 236, 238; 375/240.03, 240.01, 375/240.12; 345/629, 419, 422; 348/43, 348/70, E13.007
See application file for complete search history.

(56) References Cited

U.S. PATENT DOCUMENTS

| 6,055,012 A | 4/2000 | Haskell et al. |
| 7,444,664 B2 | 10/2008 | Lou et al. .................. 725/105 |
| 7,613,344 B2 | 11/2009 | Kim et al. ................. 382/ 232 |

(Continued)

FOREIGN PATENT DOCUMENTS

EP 1418762 5/2004

(Continued)

OTHER PUBLICATIONS

Joaquin Lopez, Jae Hoon Kim, Antonio Ortega, and George Chen, "Block-based Illlumination Compensation and Search Techniques for Multiview Video Coding," *Picture Coding Symposium*, San Francisco, CA, Dec. 2004.

(Continued)

*Primary Examiner*—Anh Hong Do
(74) *Attorney, Agent, or Firm*—Fish & Richardson P.C.

(57) ABSTRACT

Decoding a video signal comprises receiving a bitstream comprising the multiview video signal encoded according to dependency relationships between respective views, and view-dependency data representing the dependency relationships; extracting the view-dependency data and determining the dependency relationships from the extracted data; and decoding the multiview video signal according to the determined dependency relationships using illumination compensation between segments of pictures in respective views, where the multiview video signal includes multiple views each comprising multiple pictures segmented into multiple segments.

12 Claims, 1 Drawing Sheet

U.S. PATENT DOCUMENTS

| | | | | |
|---|---|---|---|---|
| 7,671,893 | B2 | 3/2010 | Li et al. | 348/211.3 |
| 7,710,462 | B2 | 5/2010 | Xin et al. | 348/218.1 |
| 7,728,878 | B2 | 6/2010 | Yea et al. | 348/218.1 |
| 2003/0202592 | A1 | 10/2003 | Sohn et al. | |
| 2004/0247159 | A1 | 12/2004 | Damera-Venkata et al. | |
| 2006/0132610 | A1 | 6/2006 | Xin et al. | |
| 2006/0146143 | A1 | 7/2006 | Xin et al. | |

FOREIGN PATENT DOCUMENTS

| | | |
|---|---|---|
| EP | 1515550 A1 | 3/2005 |
| KR | 2002-0032954 | 5/2002 |
| KR | 10-0375708 | 2/2003 |
| KR | 1020040013540 | 12/2004 |
| KR | 1020050122717 | 12/2005 |
| KR | 10-0679740 | 1/2007 |
| WO | WO 2005/018217 | 2/2005 |
| WO | WO 2005/069630 | 7/2005 |
| WO | WO 2006/014057 | 2/2006 |
| WO | WO 2006/062377 | 6/2006 |

OTHER PUBLICATIONS

P. Kauff. A. Smolie, P. Eisert, C. Fehn, K. Muller, and R. Schäfer "Data Format and Coding for Free Viewpoint Video," Proc. International Broadcast Convention IBC 2005, Amsterdam, Netherlands, pp., Sep. 2005.

Hideaki Kimara, Masaki Kitabara, Kazuto Kamikura, and Yoshiyaki Yashima, "Free-viewpoint Video Communication Using Multi-view Video Coding", NTT Technical Review Online, Aug. 2004 vol. 2 No. 8 3-D Display and Information Technologies.

A. Smolic, K. Müller, P. Merkie, C. Fehn, P. Kauff, P. Eisert, and T. Wiegand, "3D Video and Free Viewpoint Video—Technologies, Applications and MPEG Standards". In Proceedings of International Conference on Multimedia & Expo, pp. 2161-2164, Jul. 2006.

ISO/IEC JTC1/SC29/WG11, "Survey of Algorithms used for Multi-view Video Coding (MVC)". Doc. N6909, Hong Kong, China, Jan. 2005.

Wenxian Yang; Peng Wu; Yan Lu; Jianfei Cai; King Ngi Ngan Shipeng Li, "Scalable multiview video coding using wavelet" Nanyang Technol. Univ., Singapore: IEEE International Symposium on Circuits and Systems, May 2005.

Smolic, A.; Kimata, H.; Vetro, A., "Development of MPEG Standards for 3D and Free Viewpoint Video", SPIE Conference Optics East 2005:Communications, Multimedia & Display Technologies, vol. 6014, pp. 262-273, Nov. 2005.

Merkle, P, Muller, K. Smolic, A. Wiegand, T., "Efficient Compression of Multi-View Video Exploiting Inter-View Dependencies Based on H.264/MPEG4-AVC", In Proceedings of International Conference on Multimedia & Expo, pp. 2161-2164, Jul. 2006.

Kimata, H. Kitahara, M. Kamikura, K. Yashima, Y., "Hierarchical reference picture selection method for temporal scalability beyond H.264" In Proceedings of International Conference on Multimedia & Expo, pp. 181-184, Jun. 2004.

Smolic, A. and Kauff, P., "Interactive 3-D video representation and coding technologies" Proceedings of the IEEE, Publication Date: Jan. 2005, vol. 93, Issue: 1, pp. 98-110.

Sang Hyun Kim and Rae-Hong Park, "Fast local motion-compensation algorithm for video sequences with brightness variations", IEEE Transactions on Circuits and Systems for Video Technology , Publication Date: Apr. 2003, vol. 13, Issue: 4 page(s): 289-299.

"Description of Core Experiments in MVC." *International Organisation for Standardisation, ISO/IEC JTC1/SC29/WG11*, No. MPEG2006/W8019, Montreux, Switzerland, Apr. 2006, 38 pages.

Lee, Sang-Heon et al., "Inter-view motion information prediction method in MVC," *Joint Video Team (JVT) of ISO/IEC MPEG & ITU-T VCEG (ISO/IEC JTC1/SC29/WG11 and ITU-T SG16 Q.6)* 20$^{th}$ Meeting: Klagenfurt, Austria, Jul. 15-21, 2006, Document: JVT-T135, Filename: JVT-T135.doc, 13 pages.

Senoh, Taka et al., "Disparity Vector Prediction CE Plan for MVC/CE4." *International Organisation for Standardisation, ISO/IEC JTC1/SC29/WG11*, No. M13166, Montreux, Switzerland, Apr. 2006, 6 pages.

Supplementary European Search Report issued in European Application No. EP 07768721, mailed Feb. 2, 2010, 3 pages.

Zhu, Gang et al., "Inter-view Direct Mode in MVC." *International Organisation for Standardisation, ISO/IEC JTC1/SC29/WG11*, No. MPEG2006/m13177, Montreux, Switzerland, Apr. 2006, 5 pages.

"Advanced video coding for generic audiovisual services; H.264 (May, 2003)," ITU-T Standard Superseded(s), International Telecommunication Union, Geneva, CH, No. H.264, May 30, 2003, pp. 110-123.

Kim, Jae Hoon et al., "Dependent Bit Allocation in Multiview Video Coding." IEEE International Conference on Genova, Italy, Sep. 11-14 2005, Piscataway, NJ, USA, vol. 2, Sep. 11, 2005, pp. 293-296.

Lee, Yung-Lyul et al., "Multi-view Video Coding Using Illumination Change-Adaptive Motion Estimation and 2-D Direct Mode." PCM 2005, Part I, LNCS 3767, Jan. 1, 2005, Springer-Verlag Berlin Heidelberg, Germany, 2005, pp. 396-407.

Lee, Yung-Lyul et al., "Result of CE2 on Multi-view Video Coding." International Organization for Standardization, ISO/IEC JTC1/SC29/WG11, MPEG2006/M13143, Jan. 2006, Switzerland, Montreux, pp. 1-12.

Lee, Yung-Lyul et al., "Result of CE2 on Multi-view Video Coding." International Organization for Standardization, ISO/IEC JTC1/SC29/WG11, MPEG2006/M13498, Jul. 2006, Klagenfurt, Austria, pp. 1-23.

Li, Shiping et al., "Approaches to H.264-Based Stereoscopic Coding." Proceedings of the Third International Conference on Image and Graphics (ICIG'04), Dec. 18-20 2004, Dec. 18, 2004, pp. 365-368.

Ohm, Jens-Rainer, "Stereo/Multiview Video Encoding Using the MPEG Family of Standards." Part of the IS&T/SPIE Conference on Stereoscopic Displays and Applications X, San Jose, California, Jan. 1998, SPIE vol. 3639, pp. 242-253.

Supplementary European Search Report issued in application No. EP07700952, dated May 18, 2010, 9 pages.

Supplementary European Search Report issued in application No. EP07700955, dated May 18, 2010, 10 pages.

Notice of Allowance issued in U.S. Appl. No. 11/622,611, dated Apr. 30, 2010, 8 pages.

PROCESSING MULTIVIEW VIDEO

CROSS-REFERENCE TO RELATED APPLICATIONS

This application claims the benefit of U.S. Application Ser. No. 60/758,234 filed on Jan. 12, 2006, U.S. Application Ser. No. 60/759,620 filed on Jan. 18, 2006, U.S. Application Ser. No. 60/762,534 filed on Jan. 27, 2006, U.S. Application Ser. No. 60/787,193 filed on Mar. 30, 2006, U.S. Application Ser. No. 60/818,274 filed on Jul. 5, 2006, U.S. Application Ser. No. 60/830,087 filed on Jul. 12, 2006, U.S. Application Ser. No. 60/830,328 filed on Jul. 13, 2006, Korean Application No. 10-2006-0004956 filed on Jan. 17, 2006, Korean Application No. 10-2006-0027100 filed on Mar. 24, 2006, Korean Application No. 10-2006-0037773 filed on Apr. 26, 2006, Korean Application No. 10-2006-0110337 filed on Nov. 9, 2006, and Korean Application No. 10-2006-0110338 filed on Nov. 9, 2006, each of which is incorporated herein by reference.

This application is related to U.S. application Ser. No. 11/622,591 titled "PROCESSING MULTIVIEW VIDEO", U.S. application Ser. No. 11/622,611 titled "PROCESSING MULTIVIEW VIDEO", U.S. application Ser. No. 11/622,618 titled "PROCESSING MULTIVIEW VIDEO", U.S. application Ser. No. 11/622,709 titled "PROCESSING MULTIVIEW VIDEO", U.S. application Ser. No. 11/622,675 titled "PROCESSING MULTIVIEW VIDEO", U.S. application Ser. No. 11/622,803 titled "PROCESSING MULTIVIEW VIDEO", and U.S. application Ser. No. 11/622,681 titled "PROCESSING MULTIVIEW VIDEO", each of which is being filed concurrently with the present application, and each of which is also incorporated herein by reference.

BACKGROUND

The invention relates to processing multiview video.

Multiview Video Coding (MVC) relates to compression of video sequences (e.g., a sequence of images or "pictures") that are typically acquired by respective cameras. The video sequences or "views" can be encoded according to a standard such as MPEG. A picture in a video sequence can represent a full video frame or a field of a video frame. A slice is an independently coded portion of a picture that includes some or all of the macroblocks in the picture, and a macroblock includes blocks of picture elements (or "pixels").

The video sequences can be encoded as a multiview video sequence according to the H.264/AVC codec technology, and many developers are conducting research into amendment of standards to accomodate multiview video sequences.

Three profiles for supporting specific functions are prescribed in the current H.264 standard. The term "profile" indicates the standardization of technical components for use in the video encoding/decoding algorithms. In other words, the profile is the set of technical components prescribed for decoding a bitstream of a compressed sequence, and may be considered to be a sub-standard. The above-mentioned three profiles are a baseline profile, a main profile, and an extended profile. A variety of functions for the encoder and the decoder have been defined in the H.264 standard, such that the encoder and the decoder can be compatible with the baseline profile, the main profile, and the extended profile respectively.

The bitstream for the H.264/AVC standard is structured according to a Video Coding Layer (VCL) for processing the moving-image coding (i.e., the sequence coding), and a Network Abstraction Layer (NAL) associated with a subsystem capable of transmitting/storing encoded information. The output data of the encoding process is VCL data, and is mapped into NAL units before it is transmitted or stored. Each NAL unit includes a Raw Byte Sequence Payload (RBSP) corresponding to either compressed video data or header information.

The NAL unit includes a NAL header and a RBSP. The NAL header includes flag information (e.g., nal_ref_idc) and identification (ID) information (e.g., nal_unit_type). The flag information "nal_ref_idc" indicates the presence or absence of a slice used as a reference picture of the NAL unit. The ID information "nal_unit_type" indicates the type of the NAL unit. The RBSP stores compressed original data. An RBSP trailing bit can be added to the last part of the RBSP, such that the length of the RBSP can be represented by a multiple of 8 bits.

There are a variety of the NAL units, for example, an Instantaneous Decoding Refresh (IDR) picture, a Sequence Parameter Set (SPS), a Picture Parameter Set (PPS), and Supplemental Enhancement Information (SEI), etc.

The standard has generally defined a target product using various profiles and levels, such that the target product can be implemented with appropriate costs. The decoder satisfies a predetermined constraint at a corresponding profile and level.

The profile and the level are able to indicate a function or parameter of the decoder, such that they indicate which compressed images can be handled by the decoder. Specific information indicating which one of multiple profiles corresponds to the bitstream can be identified by profile ID information. The profile ID information "profile_idc" provides a flag for identifying a profile associated with the bitstream. The H.264/AVC standard includes three profile identifiers (IDs). If the profile ID information "profile_idc" is set to "66", the bitstream is based on the baseline profile. If the profile ID information "profile_idc" is set to "77", the bitstream is based on the main profile. If the profile ID information "profile_idc" is set to "88", the bitstream is based on the extended profile. The above-mentioned "profile_idc" information may be contained in the SPS (Sequence Parameter Set), for example.

SUMMARY

In one aspect, in general, a method for decoding a video signal comprises: receiving a bitstream comprising the video signal encoded according to a first profile that represents a selection from a set of multiple profiles that includes at least one profile for a multiview video signal, and profile information that identifies the first profile; extracting the profile information from the bitstream; and decoding the video signal according to the determined profile using illumination compensation between segments of pictures in respective views when the determined profile corresponds to a multiview video signal with each of multiple views comprising multiple pictures segmented into multiple segments (e.g., an image block segment such as a single block or a macroblock, or a segment such as a slice of an image).

Aspects can include one or more of the following features.

The method further comprises extracting from the bitstream configuration information associated with multiple views when the determined profile corresponds to a multiview video signal, wherein the configuration information comprises at least one of view-dependency information representing dependency relationships between respective views, view identification information indicating a reference view, view-number information indicating the number of views, view level information for providing view scalability, and view-arrangement information indicating a camera arrangement.

The profile information is located in a header of the bitstream.

The view level information corresponds to one of a plurality of levels associated with a hierachical view prediction structure among the views of the multiview video signal.

The view-dependency information represents the dependency relationships in a two-dimensional data structure.

The two-dimensional data structure comprises a matrix.

The segments comprise image blocks.

Using illumination compensation for a first segment comprises obtaining an offset value for illumination compensation of a neighboring block by forming a sum that includes a predictor for illumination compensation of the neighboring block and a residual value.

The method further comprises selecting at least one neighboring block based on whether one or more conditions are satisfied for a neighboring block in an order in which one or more vertical or horizontal neighbors are followed by one or more diagonal neighbors.

Selecting at least one neighboring block comprises determining whether one or more conditions are satisfied for a neighboring block in the order of: a left neighboring block, followed by an upper neighboring block, followed by a right-upper neighboring block, followed by a left-upper neighboring block.

Determining whether one or more conditions are satisfied for a neighboring block comprises extracting a value associated with the neighboring block from the bitstream indicating whether illumination compensation of the neighboring block is to be performed.

Selecting at least one neighboring block comprises determining whether to use an offset value for illumination compensation of a single neighboring block or multiple offset values for illumination compensation of respective neighboring blocks.

In another aspect, in general, a method for decoding a multiview video signal comprises: receiving a bitstream comprising the multiview video signal encoded according to dependency relationships between respective views, and view-dependency data representing the dependency relationships; extracting the view-dependency data and determining the dependency relationships from the extracted data; and decoding the multiview video signal according to the determined dependency relationships using illumination compensation between segments of pictures in respective views, where the multiview video signal includes multiple views each comprising multiple pictures segmented into multiple segments.

Aspects can include one or more of the following features.

The view-dependency data represents the dependency relationships in a two-dimensional data structure.

The view-dependency data comprises a matrix.

The method further comprises extracting from the bitstream configuration information comprising at least one of view identification information indicating a reference view, view-number information indicating the number of views, view level information for providing view scalability, and view-arrangement information indicating a camera arrangement.

The segments comprise image blocks.

Using illumination compensation for a first segment comprises obtaining an offset value for illumination compensation of a neighboring block by forming a sum that includes a predictor for illumination compensation of the neighboring block and a residual value.

The method further comprises selecting at least one neighboring block based on whether one or more conditions are satisfied for a neighboring block in an order in which one or more vertical or horizontal neighbors are followed by one or more diagonal neighbors.

Selecting at least one neighboring block comprises determining whether one or more conditions are satisfied for a neighboring block in the order of: a left neighboring block, followed by an upper neighboring block, followed by a right-upper neighboring block, followed by a left-upper neighboring block.

Determining whether one or more conditions are satisfied for a neighboring block comprises extracting a value associated with the neighboring block from the bitstream indicating whether illumination compensation of the neighboring block is to be performed.

Selecting at least one neighboring block comprises determining whether to use an offset value for illumination compensation of a single neighboring block or multiple offset values for illumination compensation of respective neighboring blocks.

The method further comprises, when multiple offset values are to be used, obtaining the predictor for performing illumination compensation of the first block by combining the multiple offset values.

Combining the multiple offset values comprises taking an average or median of the offset values.

In another aspect, in general, for each respective decoding method, a method for encoding a video signal comprises generating a bitstream capable of being decoded into the video signal by the respective decoding method. For example, in another aspect, in general, a method for encoding a bitstream comprises: forming the bitstream according to a first profile that represents a selection from a set of multiple profiles that includes at least one profile for a multiview video signal, and profile information that identifies the first profile; and providing information for illumination compensation between segments of pictures in respective views when the determined profile corresponds to a multiview video signal with each of multiple views comprising multiple pictures segmented into multiple segments. In another aspect, in general, a method for encoding a bitstream comprises: forming the bitstream according to dependency relationships between respective views, and view-dependency data representing the dependency relationships; and providing information for illumination compensation between segments of pictures in respective views when the determined profile corresponds to a multiview video signal with each of multiple views comprising multiple pictures segmented into multiple segments.

In another aspect, in general, for each respective decoding method, a computer program, stored on a computer-readable medium, comprises instructions for causing a computer to perform the respective decoding method.

In another aspect, in general, for each respective decoding method, image data embodied on a machine-readable information carrier is capable of being decoded into a video signal by the respective decoding method.

In another aspect, in general, for each respective decoding method, a decoder comprises means for performing the respective decoding method.

In another aspect, in general, for each respective decoding method, an encoder comprises means for generating a bitstream capable of being decoded into a video signal by the respective decoding method.

Other features and advantages will become apparent from the following description, and from the claims.

DESCRIPTION

Figure 1:
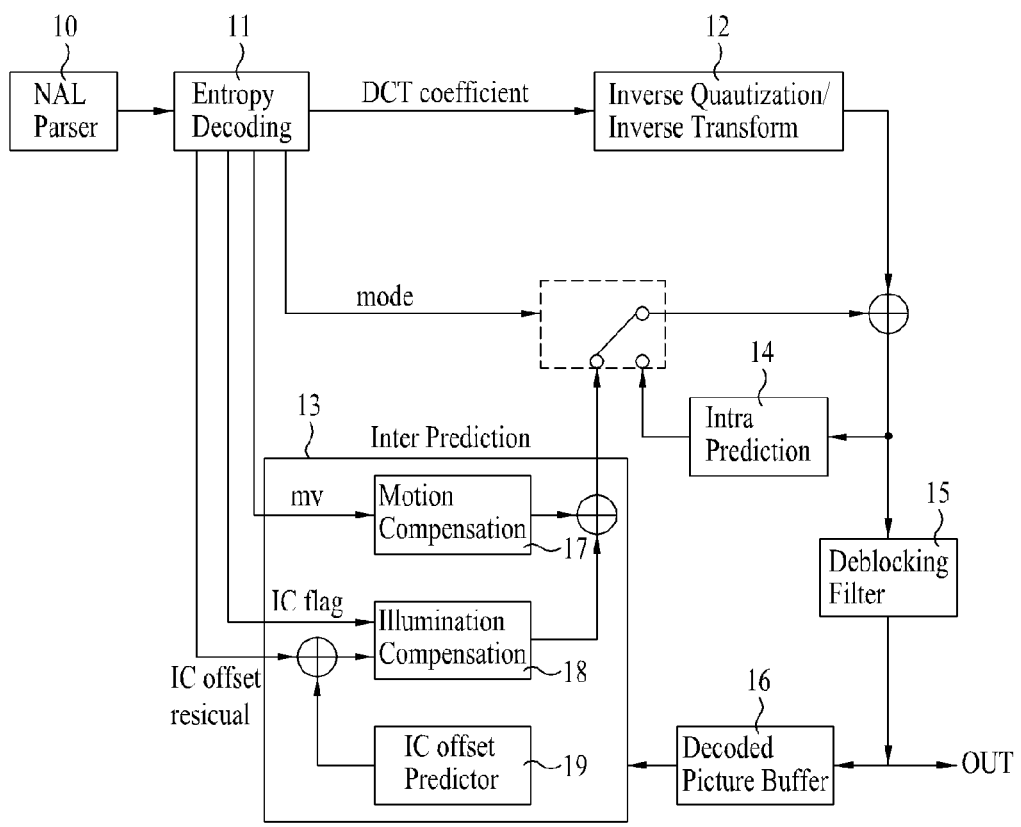
FIG. 1 is an exemplary decoding apparatus.

In order to effectively handle a multiview sequence, an input bitstream includes information that allows a decoding apparatus to determine whether the input bitstream relates to a multiview profile. In cases that it is determined that the input bitstream relates to the multiview profile, supplementary information associated with the multiview sequence is added according to a syntax to the bitstream and transmitted to the decoder. For example, the multiview profile ID can indicate a profile mode for handling multiview video data as according to an amendment of the H.264/AVC standard.

The MVC (Multiview Video Coding) technology is an amendment technology of the H.264/AVC standards. That is, a specific syntax is added as supplementary information for an MVC mode. Such amendment to support MVC technology can be more effective than an alternative in which an unconditional syntax is used. For example, if the profile identifier of the AVC technology is indicative of a multiview profile, the addition of multiview sequence information may increase a coding efficiency.

The sequence parameter set (SPS) of an H.264/AVC bitstream is indicative of header information including information (e.g., a profile, and a level) associated with the entire-sequence encoding.

The entire compressed moving images (i.e., a sequence) can begin at a sequence header, such that a sequence parameter set (SPS) corresponding to the header information arrives at the decoder earlier than data referred to by the parameter set. As a result, the sequence parameter set RBSP acts as header information of a compressed data of moving images at entry S1 (FIG. 1). If the bitstream is received, the profile ID information "profile_idc" identifies which one of profiles from among several profiles corresponds to the received bitstream.

The profile ID information "profile_idc" can be set, for example, to "MULTI_VIEW_PROFILE)", so that the syntax including the profile ID information can determine whether the received bitstream relates to a multiview profile. The following configuration information can be added when the received bitstream relates to the multiview profile.

FIG. 1 is a block diagram illustrating an exemplary decoding apparatus (or "decoder") of a multiview video system for decoding a video signal containing a multiview video sequence. The multiview video system includes a corresponding encoding apparatus (or "encoder") to provide the multiview video sequence as a bitstream that includes encoded image data embodied on a machine-readable information carrier (e.g., a machine-readable storage medium, or a machine-readable energy signal propagating between a transmitter and receiver.)

Referring to FIG. 1, the decoding apparatus includes a parsing unit 10, an entropy decoding unit 11, an Inverse Quantization/Inverse Transform unit 12, an inter-prediction unit 13, an intra-prediction unit 14, a deblocking filter 15, and a decoded-picture buffer 16.

The inter-prediction unit 13 includes a motion compensation unit 17, an illumination compensation unit 18, and an illumination-compensation offset prediction unit 19.

The parsing unit 10 performs a parsing of the received video sequence in NAL units to decode the received video sequence. Typically, one or more sequence parameter sets and picture parameter sets are transmitted to a decoder before a slice header and slice data are decoded. In this case, the NAL header or an extended area of the NAL header may include a variety of configuration information, for example, temporal level information, view level information, anchor picture ID information, and view ID information, etc.

The term "time level information" is indicative of hierarchical-structure information for providing temporal scalability from a video signal, such that sequences of a variety of time zones can be provided to a user via the above-mentioned temporal level information.

The term "view level information" is indicative of hierarchical-structure information for providing view scalability from the video signal. The multiview video sequence can define the temporal level and view level, such that a variety of temporal sequences and view sequences can be provided to the user according to the defined temporal level and view level.

In this way, if the level information is defined as described above, the user may employ the temporal scalability and the view scalability. Therefore, the user can view a sequence corresponding to a desired time and view, or can view a sequence corresponding to another limitation. The above-mentioned level information may also be established in various ways according to reference conditions. For example, the level information may be changed according to a camera location, and may also be changed according to a camera arrangement type. In addition, the level information may also be arbitrarily established without a special reference.

The term "anchor picture" is indicative of an encoded picture in which all slices refer to only slices in a current view and not slices in other views. A random access between views can be used for multiview-sequence decoding.

Anchor picture ID information can be used to perform the random access process to access data of a specific view without requiring a large amount of data to be decoded.

The term "view ID information" is indicative of specific information for discriminating between a picture of a current view and a picture of another view. In order to discriminate one picture from other pictures when the video sequence signal is encoded, a Picture Order Count (POC) and frame number information (frame_num) can be used.

If a current sequence is determined to be a multiview video sequence, inter-view prediction can be performed. An identifier is used to discriminate a picture of the current view from a picture of another view.

A view identifier can be defined to indicate a picture's view. The decoding apparatus can obtain information of a picture in a view different from a view of the current picture using the above-mentioned view identifier, such that it can decode the video signal using the information of the picture. The above-mentioned view identifier can be applied to the overall encoding/decoding process of the video signal. Also, the above-mentioned view identifier can also be applied to the multiview video coding process using the frame number information "frame_num" considering a view.

Typically, the multiview sequence has a large amount of data, and a hierarchical encoding function of each view (also called a "view scalability") can be used for processing the large amount of data. In order to perform the view scalability function, a prediction structure considering views of the multiview sequence may be defined.

The above-mentioned prediction structure may be defined by structuralizing the prediction order or direction of several view sequences. For example, if several view sequences to be encoded are given, a center location of the overall arrangement is set to a base view, such that view sequences to be encoded can be hierarchically selected. The end of the overall arrangement or other parts may be set to the base view.

If the number of camera views is denoted by an exponential power of "2", a hierarchical prediction structure between several view sequences may be formed on the basis of the above-mentioned case of the camera views denoted by the exponential power of "2". Otherwise, if the number of camera views is not denoted by the exponential power of "2", virtual views can be used, and the prediction structure may be formed on the basis of the virtual views. If the camera arrangement is indicative of a two-dimensional arrangement, the prediction order may be established by turns in a horizontal or vertical direction.

A parsed bitstream is entropy-decoded by an entropy decoding unit 11, and data such as a coefficient of each macroblock, a motion vector, etc., are extracted. The inverse quantization/inverse transform unit 12 multiplies a received quantization value by a predetermined constant to acquire a transformed coefficient value, and performs an inverse transform of the acquired coefficient value, such that it reconstructs a pixel value. The inter-prediction unit 13 performs an inter-prediction function from decoded samples of the current picture using the reconstructed pixel value.

At the same time, the deblocking filter 15 is applied to each decoded macroblock to reduce the degree of block distortion. The deblocking filter 15 performs a smoothing of the block edge, such that it improves an image quality of the decoded frame. The selection of a filtering process is dependent on a boundary strength and a gradient of image samples arranged in the vicinity of the boundary. The filtered pictures are stored in the decoded picture buffer 16, such that they can be outputted or be used as reference pictures.

The decoded picture buffer 16 stores or outputs pre-coded pictures to perform the inter-prediction function. In this case, frame number information "frame_num" and POC (Picture Order Count) information of the pictures are used to store or output the pre-coded pictures. Pictures of other view may exist in the above-mentioned pre-coded pictures in the case of the MVC technology. Therefore, in order to use the above-mentioned pictures as reference pictures, not only the "frame_num" and POC information, but also view identifier indicating a picture view may be used as necessary.

The inter-prediction unit 13 performs the inter-prediction using the reference pictures stored in the decoded picture buffer 16. The inter-coded macroblock may be divided into macroblock partitions. Each macroblock partition can be predicted by one or two reference pictures.

The motion compensation unit 17 compensates for a motion of the current block using the information received from the entropy decoding unit 11. The motion compensation unit 17 extracts motion vectors of neighboring blocks of the current block from the video signal, and obtains a motion-vector predictor of the current block. The motion compensation unit 17 compensates for the motion of the current block using a difference value between the motion vector and a predictor extracted from the video signal and the obtained motion-vector predictor. The above-mentioned motion compensation may be performed by only one reference picture, or may also be performed by a plurality of reference pictures.

Therefore, if the above-mentioned reference pictures are determined to be pictures of other views different from the current view, the motion compensation may be performed according to a view identifier indicating the other views.

A direct mode is indicative of a coding mode for predicting motion information of the current block on the basis of the motion information of a block which is completely decoded. The above-mentioned direct mode can reduce the number of bits required for encoding the motion information, resulting in the increased compression efficiency.

For example, a temporal direct mode predicts motion information of the current block using a correlation of motion information of a temporal direction. Similar to the temporal direct mode, the decoder can predict the motion information of the current block using a correlation of motion information of a view direction.

If the received bitstream corresponds to a multiview sequence, view sequences may be captured by different cameras respectively, such that a difference in illumination may occur due to internal or external factors of the cameras. In order to reduce potential inefficiency associated with the difference in illumination, an illumination compensation unit 18 performs an illumination compensation function.

In the case of performing illumination compensation function, flag information may be used to indicate whether an illumination compensation at a specific level of a video signal is performed. For example, the illumination compensation unit 18 may perform the illumination compensation function using flag information indicating whether the illumination compensation of a corresponding slice or macroblock is performed. Also, the above-mentioned method for performing the illumination compensation using the above-mentioned flag information may be applied to a variety of macroblock types (e.g., an inter 16×16 mode, a B-skip mode, a direct mode, etc.)

In order to reconstruct the current block when performing the illumination compensation, information of a neighboring block or information of a block in views different from a view of the current block may be used, and an offset value of the current block may also be used.

In this case, the offset value of the current block is indicative of a difference value between an average pixel value of the current block and an average pixel value of a reference block corresponding to the current block. As an example for using the above-mentioned offset value, a predictor of the current-block offset value may be obtained by using the neighboring blocks of the current block, and a residual value between the offset value and the predictor may be used. Therefore, the decoder can reconstruct the offset value of the current block using the residual value and the predictor.

In order to obtain the predictor of the current block, information of the neighboring blocks may be used as necessary.

For example, the offset value of the current block can be predicted by using the offset value of a neighboring block. Prior to predicting the current-block offset value, it is determined whether the reference index of the current block is equal to a reference index of the neighboring blocks. According to the determined result, the illumination compensation unit 18 can determine which one of neighboring blocks will be used or which value will be used.

The illumination compensation unit 18 may perform the illumination compensation using a prediction type of the current block. If the current block is predictively encoded by two reference blocks, the illumination compensation unit 18 may obtain an offset value corresponding to each reference block using the offset value of the current block.

As described above, the inter-predicted pictures or intra-predicted pictures acquired by the illumination compensation and motion compensation are selected according to a prediction mode, and reconstructs the current picture.

Examples of various aspects and features of the system are described in more detail in concurrently filed applications: U.S. application Ser. No. 11/622,611 titled "PROCESSING MULTIVIEW VIDEO", and U.S. application Ser. No. 11/622,709 titled "PROCESSING MULTIVIEW VIDEO", each of which is incorporated herein by reference.

What is claimed is:

1. A method for decoding multi-view video data in a multi-view video data stream, with a decoder, the method comprising:

obtaining, with a Network Abstraction Layer parsing unit, identification information representing the multi-view video data stream including inter-view prediction structure information of a random access picture, all slices in the random access picture referring only to slices having a same temporal position and being in a different view of the multi-view video data;

obtaining, with the Network Abstraction Layer parsing unit, inter-view prediction structure information of the random access picture from the multi-view video data stream based on the identification information, the inter-view prediction structure information indicating a reference relation between inter-view reference pictures;

determining, with a decoded picture buffer unit, a reference picture list of a current slice for inter-view prediction using the inter-view prediction structure information of the random access picture;

determining, with an inter-prediction unit, a prediction value of a macroblock in the current slice based on the determined reference picture list for inter-view prediction; and decoding the macroblock in the current slice using the prediction value, wherein the multi-view video data includes video data of a base view and an ancillary view, the base view indicating a view being decoded independently of other views without using inter-view prediction, and the ancillary view being a view other than the base view, wherein the inter-view reference pictures are identified by decoding order information between pictures, output order information between pictures, and view information identifying a view of each picture, wherein the decoder includes the Network Abstraction Layer parsing unit, the decoded picture buffer unit, and the inter-prediction unit.

2. The method of claim 1, wherein the inter-view prediction structure information includes number information and view identification information, the number information indicating a total number of views in the multi-view video data, and the view identification information providing a view identifier of each reference view in the multi-view video data.

3. The method of claim 1, wherein the inter-view prediction structure information of the random access picture is obtained by considering a predictive direction.

4. The method of claim 3, wherein the predictive direction represents a forward direction or a backward direction in an output order of pictures.

5. The method of claim 1, wherein the ancillary view is decoded by referring to the base view.

6. The method of claim 1, wherein the inter-view prediction structure information is obtained from sequence parameter set information of a multi-view video.

7. An apparatus for decoding multi-view video data in a multi-view video data stream, comprising:

a Network Abstraction Layer parsing unit obtaining identification information representing the multi-view video data stream including inter-view prediction structure information of a random access picture, all slices in the random access picture referring only to slices having a same temporal position and being in a different view of the multi-view video data, and obtaining inter-view prediction structure information of the random access picture from the multi-view video data stream based on the identification information, the inter-view prediction structure information indicating a reference relation between inter-view reference pictures;

a decoded picture buffer unit determining a reference picture list of a current slice for inter-view prediction using the inter-view prediction structure information of the random access picture; and an inter-prediction unit determining a prediction value of a macroblock in the current slice based on the determined reference picture list for inter-view prediction, and decoding the macroblock in the current slice using the prediction value, wherein the multi-view video data includes video data of a base view and an ancillary view, the base view indicating a view being decoded independently of other views without using inter-view prediction, and the ancillary view being a view other than the base view, wherein the inter-view reference pictures are identified by decoding order information between pictures, output order information between pictures and view information identifying a view of each picture.

8. The apparatus of claim 7, wherein the inter-view prediction structure information includes number information and view identification information, the number information indicating a total number of views in the multi-view video data, and the view identification information providing a view identifier of each reference view in the multi-view video data.

9. The apparatus of claim 7, wherein the inter-view prediction structure information of the random access picture is obtained by considering a predictive direction.

10. The apparatus of claim 9, wherein the predictive direction represents a forward direction or a backward direction in an output order of pictures.

11. The apparatus of claim 7, wherein the ancillary view is decoded by referring to the base view.

12. The apparatus of claim 7, wherein the inter-view prediction structure information is obtained from sequence parameter set information of a multi-view video.

* * * * *